Sept. 14, 1943.  B. A. BOLLINGER  2,329,384
PHOTOGRAPHIC GLASS TILE
Filed May 3, 1941
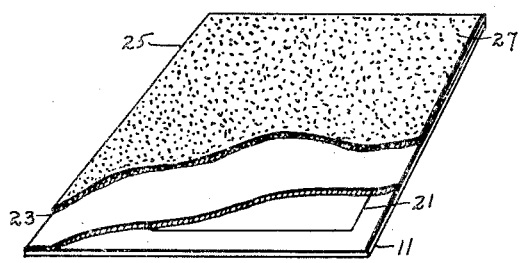
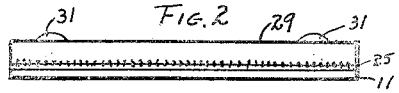
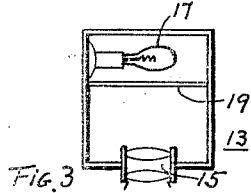
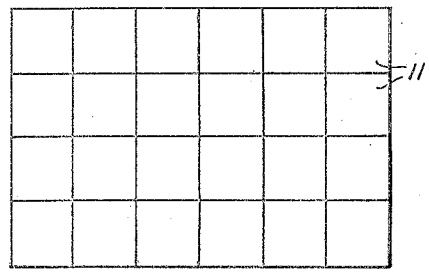
INVENTOR.
BENJAMIN ALEXANDER BOLLINGER
BY
ATTORNEY.

Patented Sept. 14, 1943

2,329,384

UNITED STATES PATENT OFFICE 2,329,384

PHOTOGRAPHIC GLASS TILE

Benjamin Alexander Bollinger, Chicago, Ill., assignor of forty-five one-hundredths to Beverly Williams, Evanston, Ill., and ten one-hundredths to Russell Baker, Lake Bluff, Ill.

Application May 3, 1941, Serial No. 391,691

5 Claims. (Cl. 41—22)

My invention relates to photographic glass tile.

One object of my invention is to provide a new and improved glass tile having a photograph on the rear surface of the glass tile.

Another object of my invention is to provide a glass tile mural having either a single sheet of glass or a plurality of sheets of glass, having on the rear side or face thereof a black and white, a color or a colored photograph of any desired subject, protected against moisture and dust in such manner as to give it indefinite life without deterioration.

Another object of my invention is to provide an improved method of manufacture of photographic glass tile.

Other objects of my invention will either be apparent from a description of a method embodying my invention and the resultant product and now preferred by me or will be set forth in the course of such description and set forth in the appended claims.

In the single sheet of drawings,

Figure 1 is a view in perspective of one sheet of glass in an intermediate state or stage of its manufacture into a photographic glass tile.

Fig. 2 is a view in end elevation of a finished glass tile having thereon a photograph.

Fig. 3 is a schematic view of a means for producing a photograph on one face of a plurality of associated panes or pieces of glass, and, Fig. 4 is a top plan view of a plurality of panes of glass shown in the positions they will occupy during certain steps in the method of making the photographic glass tile.

In practicing my invention I take one or more photographic glass plates, shown in the drawing by numeral 11, and by this name I refer to clear photographic glass having a regular film emulsion applied to one surface thereof which glass can be obtained in the open market.

I will first describe my improved method as applied to a single pane of glass 11 and will thereafter set forth such additional steps or precautionary measures as may be required to produce a plural section photographic mural embodying glass tile sections wherein they differ from the method used when only a single section is used.

I have illustrated, generally only, a photographic enlarging device 13, in Fig. 3 of the drawing, which is provided with a lens system 15 and also with a suitable source of light 17 here shown generally only as embodying an incandescent lamp. A negative 19, which it is desired to have appear on an enlarged scale on either a single section mural or a plural section mural, is suitably supported within the enlarging device 13. I wish to here point out, however, that this negative must be supported in the enlarger in a reversed position, that is, the emulsion side must be up instead of down, this being necessary so that the photograph on the glass plate or plates constituting the supporting means for the enlarged photograph will appear correctly when the picture is seen from the clear side of the single pane of glass or the plurality of panes of glasses, since it is obvious that the side having the photographic copy thereon is the inner side, all as will be hereinafter set forth.

If only a single section 11 of photographic glass is used, the adjustment in the enlarger will, of course, be made so that the size of the enlarged negative has the proper relation to the entire surface of the single plate 11. The emulsion side of the photographic glass plate on which the enlarged reproduction of the negative 19 is to be located is also up, so that when the negative is projected in reverse, as hereinbefore described, it will print in reverse on the glass plate, this, of course, being for the reason set forth above.

After the projection has been made on the single sheet of photographic glass 11 it is developed in the usual manner and then placed in a hardening bath, fixed and washed and then dried, as any other glass plate or film would be treated.

The glass plate is then positioned on a suitable support with the dried emulsion side up so that the complete picture appears in reverse. When an ordinary black and white print is used and it is desired to color the photograph, each color is applied by hand using dyes and water colors. Any color and as many colors as are wanted can be used to produce a colored photograph. It is necessary to determine the background before the color work starts but such background is not put on first as it must constitute the last step in the coloring of the photographic glass plate print since it covers all the emulsion and the colors applied to it and forms or acts as a reflector for the color applied to the photographic plate, as viewed from the clear side of the glass. In the case of darker or dark backgrounds with other figures in the photograph in lighter color, the lighter figures must be painted over with white or with some other light color before the dark background is applied since otherwise the light colors will not be reflected. In other words, all coloring of the photograph embodying my invention is done in just the opposite manner of the method used on normal paintings. Instead of first painting the background and then building up the high lights of the figures, the high lights and figures are colored first and then backed up with a color chosen as their reflector and then the background is applied last.

I have illustrated the photograph in its initially completed form, that is, after it has been dried, by the numeral 21 in Fig. 1 of the drawing, and while no specific background is shown in Fig. 1 of the drawing, this is for the reason that it is difficult to show in a drawing and it has therefore been described as in the above paragraphs.

After the coloring of the photograph and the painting of the background has been finished, the glass tile thus far made is permitted to dry in a dust-free atmosphere. After that I apply to the outer surface of the background a first coat of oil paint or of a suitable enamel 23, by spraying or in any other manner, the color of the enamel being selected with reference to the general tone of the photograph and of the background already applied to plate 11. I may dry the first coat of enamel by merely subjecting it to air temperature or I may, by using a heat drying enamel, subject it to a higher temperature in order to hasten the process and shorten the time of this step. I may then apply a second coat of enamel 25 which may be sprayed on or applied in any other manner and this second coat may be oven dried or may be air dried, depending generally upon the material actually used and the speed desired in the manufacture of such plates. I may also apply another coat of enamel or oil paint and I desire it to be understood that I may apply only one coat or two or three coats of enamel or oil paint.

Before the outer coat of enamel 25 is at all dry, and preferably while it is still wet, for instance immediately after it has been applied, I subject it to a thin spray or stream of coarse sharp grained sand so that the sharp corners, edges or projections on the individual grains of sand will enter into the wet or damp coat of enamel just applied but will permit the individual grains to project beyond the coat of enamel. The purpose or use of this coat of sand, which is a foraminous coating of a bonding material, will be hereinafter set forth. In order to ensure that only such grains of sand will remain in this layer as are partially embedded in the outer coat of enamel 25, I may turn the plate momentarily upside down after sanding it so that any sand not embedded in the damp enamel will drop off. I have indicated by a series of small dots 27 in one corner of the coat of enamel 25 in Fig. 1 of the drawing this foraminous or perforate layer of sand.

After this outer coat of enamel has been thoroughly dried I apply thereto a relatively thick backing 29 of a plaster-like material and I may use any one or a combination of several different materials such as plaster, plaster compositions, plaster of Paris, cement and preferably a waterproof material of any similar kind. I may mention here that the thickness of this plaster backing is on the order of one-quarter inch or even slightly more and I desire to point out that this is an important element in my invention. The plaster backing must be water impervious to as great an extent as it is possible to provide in such materials since it is possible that a photographic mural of this kind may be positioned against a wall or surface outside of a building but even though it is positioned against a supporting surface or a wall inside a building, it will still be subjected not only to relatively dry air but also to relatively damp or moist air during its ordinary life. I may roughen the outer surface of the plaster composition backing 29 before it dries to cause the adhesive which will be applied to it later, to adhere better. The outer surface of element 29 is sized, as with a waterproof material, to increase the resistance to the entrance of moisture.

A further step in the preparation of such a photographic tile mural will be the application of either a layer or proper adhesive of the outside surface of the plaster backing 29 or the application of small masses 31 of a suitable adhesive, such as mastic, spaced apart over the rear surface of element 29, whereby the individual plate prepared as hereinbefore stated, may be secured against either a portable board or backing whereby it is possible to mount the substantially complete photographic tile mural against a fixed wall. If an intermediate board or backing is used to support the plate 11, small masses of mastic may be applied to the rear surface of this backing or board and any desired means for sealing or closing the outer peripheral edges of the plate may be provided.

I may here point out that the thickness of the backing 29 of a suitable plaster material is made relatively large so as to enable the installer placing it in position on a wall to easily mount it thereagainst and I have found that this is almost impossible when the thickness of the backing 29 is as thin as has been used up to the present time. A relatively thick backing also assists in making the tile stand out from the wall without the use of extraneous means, such as spacing supporting frames.

Assuming that such a single piece of tile is to be mounted on a wall of a room, a plurality of small masses of mastic 31 may be applied to the outer or rear surface of backing 29 and the portion of the wall against which the tile is to be located may be sized with water-impervious material. The tile may then be firmly pressed against the wall to compress and spread the masses of mastic and it is evident that any unevennesses in the surface of the wall can easily be taken care of when the tile is pressed against the wall. Any desired or suitable frame or moulding can be used to give the assembly a pleasing appearance.

Let it now be assumed that we desire to have a photographic tile mural in which the photograph spreads over a plurality of panes of glass 11, such as is shown in Fig. 4 of the drawing where I have indicated generally only twenty-four contiguous sheets of glass 11 to form a substantially rectangular mural. I have shown a plurality of such tiles as being supported on an enlarging table 33, in Fig. 3 of the drawing, but it is to be understood that this is a very general showing only. I have found it desirable to make sure that each of the plurality of glass plates is placed as closely as possible to the others so that there will be no apparent seam between the adjacent engaging or contiguous plates 11.

I have further found it necessary to make sure that the photograph on each tile or glass plate is developed to the same degree or for the same length of time to ensure a uniform density. This is very important as each individual plate must match the others to cause the complete picture to look as through it had been made at substantially the same time and under the same operating conditions.

The same comments made above in the making of a colored photograph on a single piece of glass will apply when a plurality of individual panes or sheets of glass are used.

It is, of course, necessary to mount the plurality of individual sections or sheets of glass on a suitable intermediate support which may be or be similar to "Nu-Wood" and I prefer to apply a sizing coat of a water-proof material, including shellac, which will assist the plaster material in properly protecting the photographic reproduction of any desired view or scene. The size will also be applied to a wall against which the tile mural is applied. Before positioning the individual sketches of the glass tile when it is in the condition shown in Fig. 2 of the drawing, that is, the rather thick plaster backing has been applied thereto, the edges of each of the glass sheets are seamed, that is, the edges of the coat of paint or enamel and of the plaster backing is straightened and given a slight angle inwardly from the inner surface of the sheet of glass, this being necessary to ensure the contiguity of adjacent sections of glass forming or constituting a tile mural. The small spaces between adjacent pieces of glass are filled with any suitable waterproof filling now well known in the art.

The same general method of securing the individual sheets of glass against its movable supporting member as hereinbefore described for a single section mural may be employed and the small masses of mastic may be applied to the outer or rear surface of the portable support whereby it may be secured against any wall against which it is to be mounted. Further, any desired frame or moulding either of metal or of wood may be applied thereto and it is, of course, also possible to locate or place such a plural section glass tile mural in a frame of suitable design and appearance cooperating with the photograph shown in the mural to present a pleasing appearance.

I have thus far described a method of making a colored photograph mural but it is also possible to apply color photographs to such murals and where I have used the words "colored photograph" I desire it to be understood that this refers also to a color photograph and substantially the same steps, other than the coloring of the photograph by hand, will be used.

The photographic glass tile for mural use embodies certain novel steps in its process of manufacture and also is novel in that it includes either a color photograph or a colored photograph of any desired object, view, scene or person or, in general, a photograph of any subject which it is desired to show.

While I have illustrated and described a specific embodiment of my invention, I do not desire to be limited thereto and all obvious modifications thereof coming within the scope of the appended claims are to be considered as being covered thereby.

I claim as my invention:

1. A photographic tile mural comprising at least one clear glass plate having a reversed colored photographic picture on one side thereof, at least one coat of color enamel on that side of the glass plate having the photographic picture thereon, said enamel having substantially the same coefficient of expansion and contraction as the glass, a layer of spaced grains of sharp coarse sand partly embedded in the outer coat of enamel, a relatively thick backing of a water impervious plaster composition engaging said enamel and said layer of sand, said backing having substantially the same coefficient of expansion and contraction as the enamel and the glass, a supporting board adjacent to the outside surface of the backing and an adhesive between the backing and said supporting board to secure said tile to said supporting board.

2. A photographic tile mural comprising a plurality of pieces of contiguous clear glass panes, a reversed color photograph on one side of said pieces of glass, two coats of color enamel on the outside of and engaging the positive, a foraminous layer of sharp coarse grained sand partly embedded in the outer coat of enamel, a relatively thick backing of a water impervious plastic composition on the outside of and engaging the outer coat of enamel and partly embedding the layer of sand, said glass, enamel coats and backing having substantially like coefficients of expansion and contraction, a supporting board for said pieces of glass adjacent to the outside surface of the backing and an adhesive compressed between the backing and the board to hold said tile mural against said supporting board.

3. The method of making a photographic glass tile mural which comprises the steps of printing a photographic picture on that side of a pane of glass having a light sensitive emulsion thereon from a reversed negative, developing said picture, hardening, fixing, washing and drying said picture, coloring the picture, applying at least one coat of color enamel having substantially the same coefficient of expansion and contraction as the glass, applying a foraminous coat of sharp coarse grained sand to said coat of enamel to partly embed the grains of sand in said enamel, drying said enamel, applying a relatively thick backing of a water impervious plaster composition having substantially the same coefficient of expansion and contraction as the enamel and the glass, drying said backing, seaming the edges of said backing, sizing said backing and securing said pane of glass by an adhesive against a supporting wall.

4. The method of making a photographic glass tile mural which comprises the steps of printing a photographic picture on that side of clear photographic glass having a light sensitive emulsion thereon from a reversed negative, developing said picture, hardening, fixing, washing and drying said picture, coloring the hightlights and figures, applying a background color over the entire picture side of said glass, applying a relatively heavy coat of enamel over said background, thoroughly drying said enamel, applying a second relatively heavy coat of enamel, applying a foraminous layer of sharp coarse grained sand to said wet enamel, thoroughly drying said second coat of enamel, applying a relatively thick backing of a water impervious plaster composition material having substantially the same coefficient of expansion and contraction as the enamel and the glass against the second coat of enamel, drying said backing and applying an adhesive to the outside surface of said backing for securing said glass tile against a support.

5. A photographic glass tile mural comprising a plurality of contiguous pieces of clear photographic glass, a colored reversed photograph on one side of said pieces of glass, a color background on said one side of the pieces of glass, a plurality of coats of enamel on said color background, said enamel having substantially the same coefficient of expansion and contraction as that of the glass, a relatively thick protective backing of a water impervious plaster composition material on said enamel, a plane supporting board, an adhesive between the outer surface of the backing and the supporting board, a waterproof filling adjacent contiguous edges of the pieces of glass and a waterproof seal for the outer edges of the glass tiles.

BENJAMIN ALEXANDER BOLLINGER.